July 28, 1931.  L. B. SCOTT  1,816,093
BRAKE FOR AUTOMOBILES
Filed Nov. 19, 1928
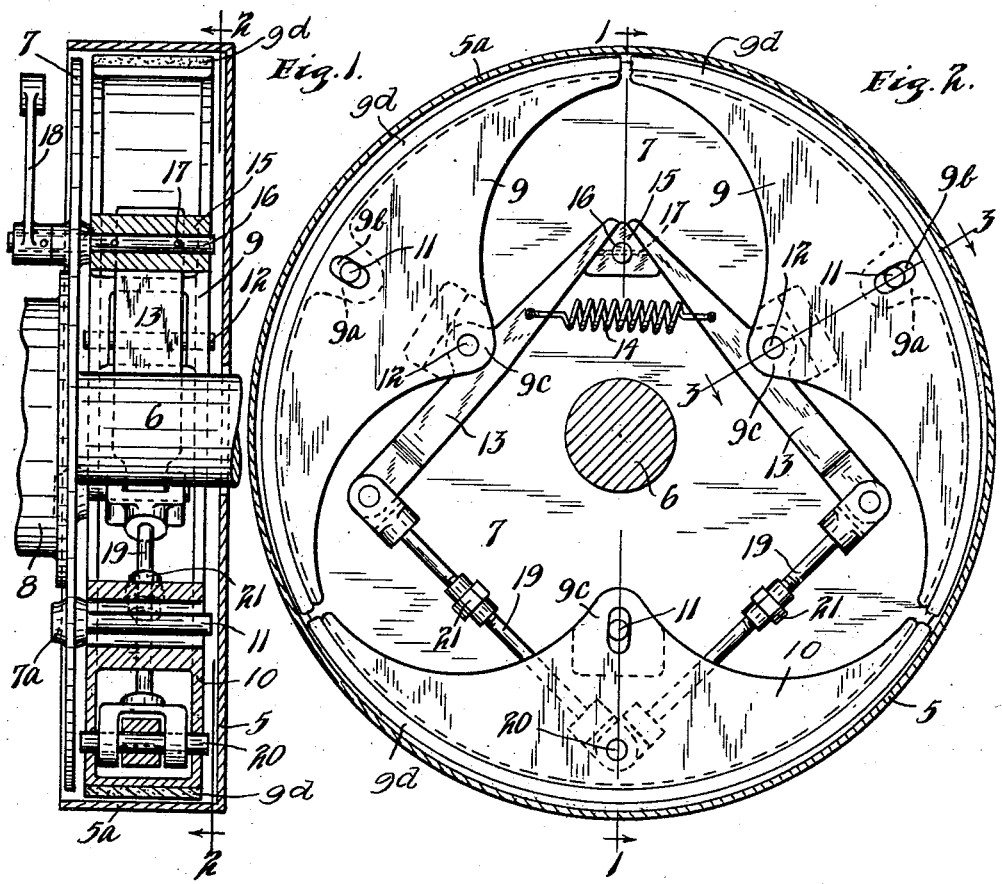
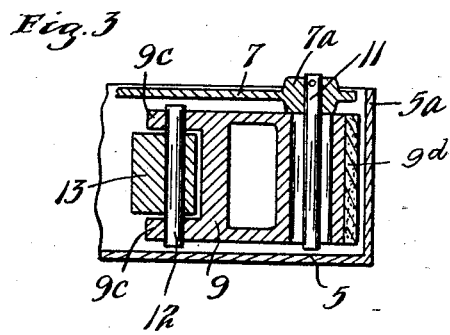
INVENTOR.
LYLE BURNELL SCOTT.
BY HIS ATTORNEYS Patented July 28, 1931

1,816,093

UNITED STATES PATENT OFFICE

LYLE BURNELL SCOTT, OF ESTELLINE, SOUTH DAKOTA

BRAKE FOR AUTOMOBILES

Application filed November 19, 1928. Serial No. 320,342.

This invention relates to a brake device such as commonly used on automobiles. Such brakes now commonly comprise a cylindrical drum against the interior of which are pressed braking members to frictionally engage said interior. It is desirable in such brake structures to have the braking members or shoes which engage the interior periphery of the drum provided with engaging surfaces extending substantially throughout the entire surface of said drum or through substantially 360 degres. It is also desirable to have the brake shoes of substantialy the same curvature as the drum and movable radially so as to effectively engage the periphery of the drum.

It is an object of this invention, therefore, to provide a brake device comprising a drum, a plurality of shoes engaging said drum throughout substantially 360 degrees, together with means for moving said shoes into engagement with said drum.

It is another object of the invention to provide a brake structure comprising a drum, a plurality of brake shoes, each having substantially the curvature of the drum and adapted to be moved outwardly substantially radially to engage said drum.

It is still another object of the invention to provide a brake device comprising a drum, a plurality of brake shoes engaging the same and movable radially, together with mechanism for moving all of said shoes against the drum with equal force.

These and other objects and disadvantages of the invention will be fully set forth in the following description made in connection with the accompanying drawings, in which like reference characters refer to similar parts throughout the several views, and in which:—

Fig. 1 is a vertical section taken on line 1—1 of Fig. 2;

Fig. 2 is a vertical section taken on line 2—2 of Fig. 1, and

Fig. 3 is a vertical section taken on line 3—3 of Fig. 2, said sections being taken as indicated by the arrows.

Referring to the drawings, a brake device is shown comprising a drum 5 having a cylindrical portion or shell 5a, said drum being secured to the axle in the usual manner not shown. The axle 6 is shown as extending centrally of the drum 5 and a plate 7 illustrated as of circular form is carried on axle 6 and secured in any suitable manner to the axle housing 8. A plurality of brake shoes 9 and 10 are provided, and while the number of these shoes might be varied, in the embodiment of the invention illustrated, three of said shoes are shown. The shoes 9 and 10 have outwardly curved surfaces and the ends of adjacent shoes are very slightly spaced so that the curved surfaces of the shoes extend substantially throughout 360 degrees of the entire interior surface of the drum 5. The shoes 9 have secured to their curved surfaces the lining or frictional material 9d. The curvature of the curved surfaces of the shoes and hence of the material 9d is substantially the same as the curvature of the interior of the drum 5, said shoes 9 have bosses 9a through which extend the elongated slots 9b. The pins 11 extend to the slots 9b, said pins being secured in bosses 7a on the plate 7. The pair of shoes 9, as shown in Fig. 2, have spaced bosses 9c between which are pivoted on the pins or pintles 12, levers 13. The levers 13 are similar, but reversely disposed, and are connected adjacent their ends by a tensile coiled spring 14. A triangular cam 15 is disposed between the upper ends of levers 13, said cam being secured to a shaft 16 by the pins 17, said shaft extending through a boss on plate 7 and having secured thereto the arm 18 forming the usual operating arm for the brake. This arm is usually connected to the brake operating mechanism, which extends to the foot pedal of the automobile. The other or lower ends of levers 13 are respectively connected by links 19 to the lower shoe 10, the links 19 being pivotally connected to the ends of levers 13 and pivotally connected by a common pivot pin 20 mounted in the shoe 10. Links 19 are shown as comprising turnbuckles 21 by means of which the length of the links may be varied.

In operation, the brake shoes 9 and 10, which it will be seen, are carried on the plate 7, or on the pins 11 and guided thereon, are held in retracted position out of engagement with the drum by the spring 14. The upper ends of the lever 13 at this time engage the sides of cam 15. When the brakes are applied and the arm 18 oscillated, cam 15 is turned and its angular portions or corners are brought between the ends of the levers 13 so that said levers are forced apart. Due to the fact that the other ends of said levers are connected by the links 19 to the shoe 10, the links 19 are pushed upon when the upper ends of levers 13 are separated. This movement moves all of the shoes 9 and 10 outwardly toward the drum and all will be made to engage the drum with equal pressure. This equal pressure results from the articulated mechanism including levers 13 and the links 19. The shoes 9 and 10 with the material 9d thereon will thus engage the interior of the drum for substantially 360 degrees and since the curvature of the shoes is substantially that of the drum, a very effective engagement will be secured. When the pressure on the foot lever is relieved, spring 14 will again move the ends of lever 13 inwardly to engage cam 15 as shown in Fig. 2 and the shoes will be moved inwardly and the brakes released.

From the above description it is seen that applicant has provided quite a simple brake structure and one which will have a very effective braking action. The brake drum is engaged through substantially all of its periphery and the shoes can be made to have substantially the curvature of the drum. The shoes are also moved outwardly simultaneously and pressure is applied equally on all of the shoes, thus adding to the effectiveness of the braking action. It is apparent that the device will have a high degree of utility for the purpose for which it is intended.

It will, of course, be understood that various changes may be made in the form, details, proportions and arrangement of the parts, without departing from the scope of applicant's invention, which generally stated, consists in a device capable of carrying out the objects above set forth, in the novel parts and combinations of parts disclosed and defined in the appended claims.

What is claimed is:—

1. A brake structure comprising, a brake drum, three brake shoes within said drum and engaging the interior periphery of said drum throughout substantially its entire circumferential surface, said shoes being movable in substantially radial directions, levers respectively pivoted intermediate their ends to a pair of said shoes, links respectively pivotally connecting the ends of said levers to the other of said shoes, and means engaging and moving the ends of said levers whereby said shoes are moved outwardly and pressed against said drum with equal force.

2. A brake device comprising, a brake drum, a plurality of shoes engaging the interior of said drum, a pair of levers respectively pivoted between their ends to a pair of said shoes and an articulated mechanism connected to corresponding ends of said levers and to the remainder of said shoes to press said shoes outwardly against said drum, means for moving said levers to press said shoes against said drum and means for moving said levers inwardly to release said shoes.

3. A braking device having in combination, a drum, three shoes having a total circumferential extent of substantially 360 degrees engaging said drum, said shoes being movable radially, levers secured to a pair of adjacent shoes, means engaging corresponding ends of said levers to separate the same, resilient means for moving said levers together, and means pivotally connected to the other ends of said levers and pivotally connected to the other shoe.

4. A brake device having in combination, a drum, three shoes engaging the interior of said drum and having substantially the curvature of said interior, a pair of levers respectively pivoted to a pair of said shoes, said levers having corresponding ends adjacent each other, means between said ends and engaged thereby for separating said levers, resilient means for moving said levers toward each other and into engagement with said means, links pivotally connected to the other ends of said levers respectively and pivotally connected about a common pivot to the other shoe, said links being adjustable in length.

5. A brake device comprising, a drum, a plurality of shoes in said drum having curved surfaces for engaging the interior periphery of said drum, an articulated equalizing mechanism connecting said shoes and including a pair of levers with an intermediate portion of which a pair of said shoes are respectively connected, links respectively connected at one end to the ends of said levers and pivotally connected at their other ends to another shoe and means for moving said shoes inwardly.

6. A brake device comprising, a drum, a plurality of shoes in said drum having curved surfaces for engaging the interior periphery of said drum, an articulated equalizing mechanism connecting said shoes and including a pair of levers to which a pair of said shoes are respectively connected and an articulated mechanism connected to the ends of said levers and to the remainder of said shoes.

In testimony whereof I affix my signature.

LYLE BURNELL SCOTT.